July 5, 1955  D. L. SPRINKLE  2,712,346
ADJUSTABLE SEAT

Filed March 31, 1952  2 Sheets-Sheet 1

INVENTOR.
DALLAS L. SPRINKLE
BY
R. L. Miller
ATTORNEY

July 5, 1955 D. L. SPRINKLE 2,712,346
ADJUSTABLE SEAT
Filed March 31, 1952 2 Sheets-Sheet 2

INVENTOR.
DALLAS L. SPRINKLE
BY
R. L. Miller
ATTORNEY

United States Patent Office 2,712,346
Patented July 5, 1955

2,712,346

ADJUSTABLE SEAT

Dallas L. Sprinkle, Akron, Ohio, assignor, by mesne assignments, to The Goodyear Tire & Rubber Company, a corporation of Ohio Application March 31, 1952, Serial No. 279,512

5 Claims. (Cl. 155—14)

This invention relates to adjustable seats, and particularly to a seat especially adapted for use in a vehicle, such as a truck, and wherein the seat is provided with a plurality of independently movable adjustments for the positioning of the seat.

Heretofore there have been various kinds of seats proposed and manufactured for use in vehicles, such as trucks, so that the driver can adjust the seat to have maximum comfort while sitting in the seat for long periods of time. In view of the widely different heights and builds of truck drivers, and the fact that frequently different truck drivers drive the same truck a different times, it is particularly desirable that a wide variety of adjustments be provided in seats of this type. Of course, such seats conventionally have a front to rear adjustment and some seats may have another adjustment, such as a change in the vertical position of the seat. However, none of such seats known to me have been provided sufficient adjustments so that the seat really can be individually positioned to best support a given person in such seat.

It is the general object of the present invention to provide a seat construction of the class described which is characterized by the plurality of independent adjustments of the seat for positioning the seat base and back to support one individual very comfortably.

Another object of the invention is to position a seat frame in a vehicle for front to rear adjustment therein, and to provide additional means for changing the position of the seat base and back in the frame.

Another object of the invention is to provide a seat base that automatically adjusts its front to rear position and its angle of inclination with changes in the vertical angle of the seat back.

Additional objects of the invention are to provide a seat base which is only slidably positioned upon adjustable support means provided therefor; to provide individual means for varying the vertical height of the front or the rear portion of the seat, or both portions of the seat, and to provide a special positioning of the upper portion of the seat back to permit adjustment of the vertical angle of the seat back by means associated with the base part of the seat back.

Yet another object of the invention is to provide a sturdily constructed seat that is adapted to provide a maximum service life with a minimum of maintenance and which is of relatively inexpensive construction.

The foregoing and other objects and advantages of the invention will be made more apparent as the specification proceeds.

For a better understanding of the invention, reference should be had to the accompanying drawings, wherein.

Figure 4:
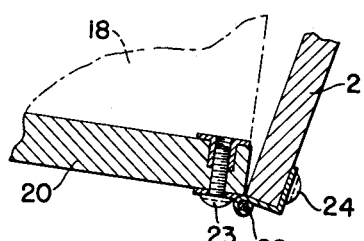
Fig. 4 is a fragmentary enlarged vertical section of the connection between the seat back and the seat base.

The seat of the invention includes a main frame, means positioning the main frame for front to rear movement, a seat back frame, a seat bottom frame, and means for securing the seat back frame in a vertically adjustable manner. The seat bottom frame also is positioned so that the vertical position of both the front and the rear portion of such seat bottom frame can be individually varied with relation to the remainder of the seat.

Reference now should be had to the details of the structure shown in the drawings, and the seat of the invention is generally indicated by the numeral 1 and includes a main frame 2. This main frame 2 is adjustably positioned by a pair of side rails 3 and 4 for front to rear movement to adjust the position of the seat 1 as a unit with relation to a support 5 to which the side rails 3 and 4 are secured by means of support brackets 6 to the support provided for the seat of the invention 1. The main frame 2 includes tubular members 7 that are slidably engaged with the side rails 3 and 4, and the tubular members 7 can be locked in any of a number of adjustable positions on the side rails by conventional means provided for that purpose.

Figure 3:
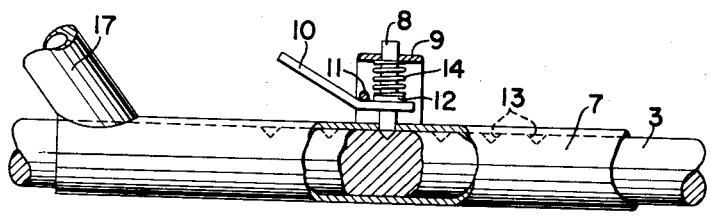
Fig. 3 is an enlarged detail, partially shown in vertical section, of the means used for positioning the seat frame upon the side rails of the seat.
Figure 2:
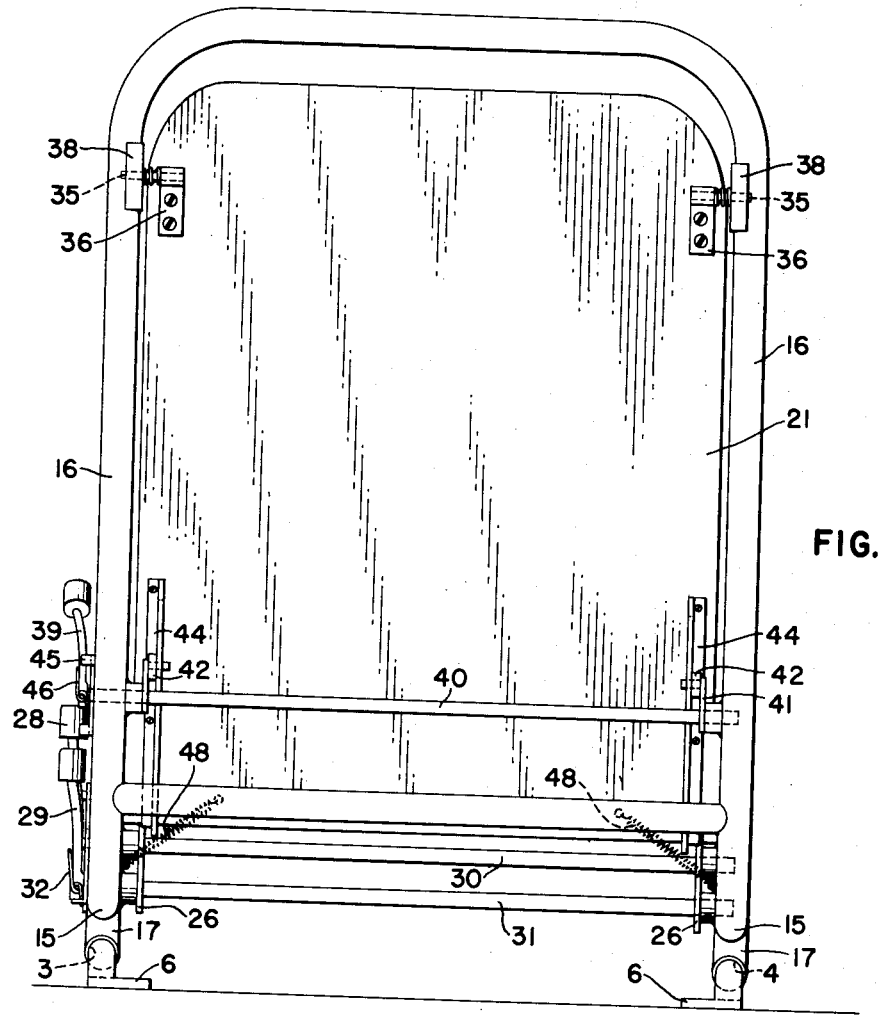
Fig. 2 is a rear elevation of the seat of Fig. 1 taken on line 2—2 of Fig. 1.
Figures 5, 6:
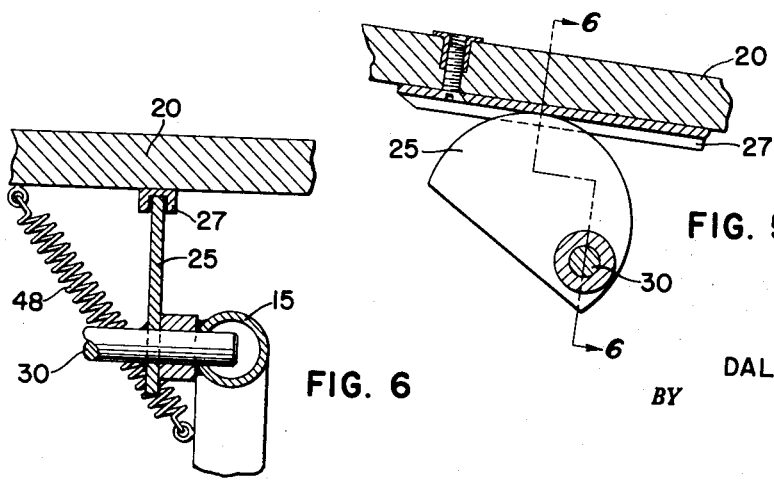
Fig. 5 is a fragmentary vertical section showing the means for adjustably supporting the seat base.
Fig. 6 is a fragmentary vertical section taken on line 6—6 of Fig. 5.

Fig. 3 of the drawings best shows the means used to secure the seat 1 in a given position and they include a locking pin 8 which is positioned by an inverted U-shaped bracket 9. The bracket 9 is secured to one of the tubular members 7 and pivotally positions a release finger 10 by a pin 11. One portion of the release finger 10 engages a flange 12 suitably formed on or secured to the locking pin 8 so that it can move the locking pin upwardly and release it from engagement with any one of a plurality of locking notches 13 formed in an upper portion of the side rail 3. Thus the locking pin 8 can secure the main frame 2 in a locked position with relation to the side rails 3 and 4. The locking pin 8 is urged downwardly by means of a coil spring 14 compressed between a part of the bracket 9 and the flange 12. The locking pin 8 will be automatically urged into a new locking position after the pin is released from one of the notches 13 and the main frame is slid along the side rails, so that a desired front to rear adjustment is provided for the main frame 2 and the seat support provided thereby.

The main frame 2 is shown as including a substantially U-shaped base 15 which lies in a substantially horizontal plane and a substantially U-shaped back 16 which is inverted and lies in a substantially vertical plane. Adjacent portions of the base 15 and back 16 are usually integrally secured together so that a unitary generally L-shaped base and back construction results and this portion of the main frame 2 may be reinforced in any suitable manner. The base 15 and back 16 preferably are formed from metal tubes of suitable composition and are supported on the tubular members 7 in a conventional manner, as by means of support tubes 17 which may be welded or otherwise secured to the base 15 and the tubular members 7.

The seat 1 of the invention is shown as including a base cushion 18 and a back cushion 19, which cushions are of any desirable construction but which are preferably formed from a light weight cushioning material, such as cellular or foam rubber which provides a maximum of seating comfort with a minimum of thickness. The base cushion 18 is supported on a frame comprising a seat bottom such as a base board 20 and the back cushion 19 is supported on a seat back such as a back board 21, which boards or similar members are used to provide a support frame for the base and back cushions, respectively, and may be formed from conventional material, such as a sheet of plywood, when the cushions are made from foam rubber, or similar material.

As one feature of the invention, the base board 20 and back board 21 are shown in Fig. 4 as being pivotally secured together, for example, by one or more hinges 22 which are secured to the base board 20 by bolts 23 and to the back board 21 by cap screws 24. Thus, any adjustment in the position of either the base board 20 or the back board 21 will produce some similar or corresponding adjustment in the other board depending upon which board has the adjustment made in the supporting means therefor.

In order to adjust the vertical height of the base cushion 18 individually at either the front or the rear thereof and thereby to adjust the pitch thereof, an important feature of the invention resides in supporting the base board 20 upon front and rear cam plates 25 and 26, respectively. A pair of these front and rear cam plates 25 and 26 are provided on each side of the base board 20 and they engage with elongate bearing plates 27 of substantially inverted U-shape in cross-section providing substantially rectilinear guideways that are suitably secured to the base board 20 at each lateral margin thereof for receiving the uppermost portion of the cam plates 25 and 26 to be supported thereon. The front and rear cam plates 25 and 26 are controlled by control levers 28 and 29, respectively, with the control levers being pivotally supported on shafts, or rods 30 and 31, which are rotatably carried by the base 15 and extend thereacross. These shafts 30 and 31 are suitably fixedly secured, as by welding, to the respective cam plates 25 and 26 whereby arcuate movement of either of the shafts varies the arcuate positions of the cam plates 25 or 26. The shaft 30 extends transversely of the base 15 at the forward portion thereof and engages with both of the front cam plates 25 to control them in a unitary manner, whereas the shaft 31 is positioned at the rear part of the base 15 and is secured to both of the rear cam plates 26 to make them movable in a unitary manner. Normally, the control levers 28 and 29 have suitable spring means 32 associated therewith to urge such control levers towards a lock plate 33 adjacent each such control lever. Each control lever has a suitable stud (not shown) provided thereon for engagement with circumferentially spaced bores 34 provided in the lock plates 33 which are secured to the base 15 adjacent each of the shafts 30 and 31 for locking the control levers 28 and 29 and associated mechanism in a given position. Thus the front and rear cam plates are secured in a desired position to retain the associated part of the base cushion 18 in a given vertical position with relation to the remainder of the seat. Of course, the control levers 28 and 29 can be individually moved.

In order to control the vertical relationship of the back cushion 19 to the remainder of the seat, a pair of studs 35 are secured to the back board 21 with such studs extending laterally beyond the back board 21. Usually the studs 35 are positioned adjacent the upper portion of the back board by means of brackets 36. The studs 35 engage with the back 16 in a suitable manner, as by extending into elongate slots 37 provided in opposed inner portions of the back 16. Usually the connection between the pins 35 and the slot 37 is reinforced by means of half-round cradles 38 through which the pins 35 snugly extend. The cradles 38 in turn snugly engage the tube from which the back 16 is formed for sliding engagement therewith.

The base portion of the back cushion 19 is supported in an adjustable manner and the support means include the use of a control lever 39 which is secured to a shaft 40 that extends transversely of the back 16 of the main frame 2 with such shaft 40 carrying a control arm 41 at each lateral margin of the main frame 2. These control arms 41 preferably journal rollers 42 at the free ends thereof and the rollers 42 are suitably slidably engaged with slots 43 formed in brackets 44. These brackets 44 are secured to the rear, lower edge portions of the back board 21. Rotary movement of the control arms 41 by the control lever 39 moves the back board 21 and thus the back cushion 19 to vary its vertical relation to the back 16 of the main frame 2 and effect the desired adjustment of this portion of the seat 1. It will be realized that the pivotal connection between the base board 20 and back board 21 and the slidable positioning of the base board 20 provides an automatic adjustment of the front to rear position of the base cushion 18 with any adjustment in the vertical positioning of the back cushion 19 and without changing the pitch of the base cushion when the base and back boards are hingedly secured together and the base cushion is supported on the cams 25, 26.

Figure 1:
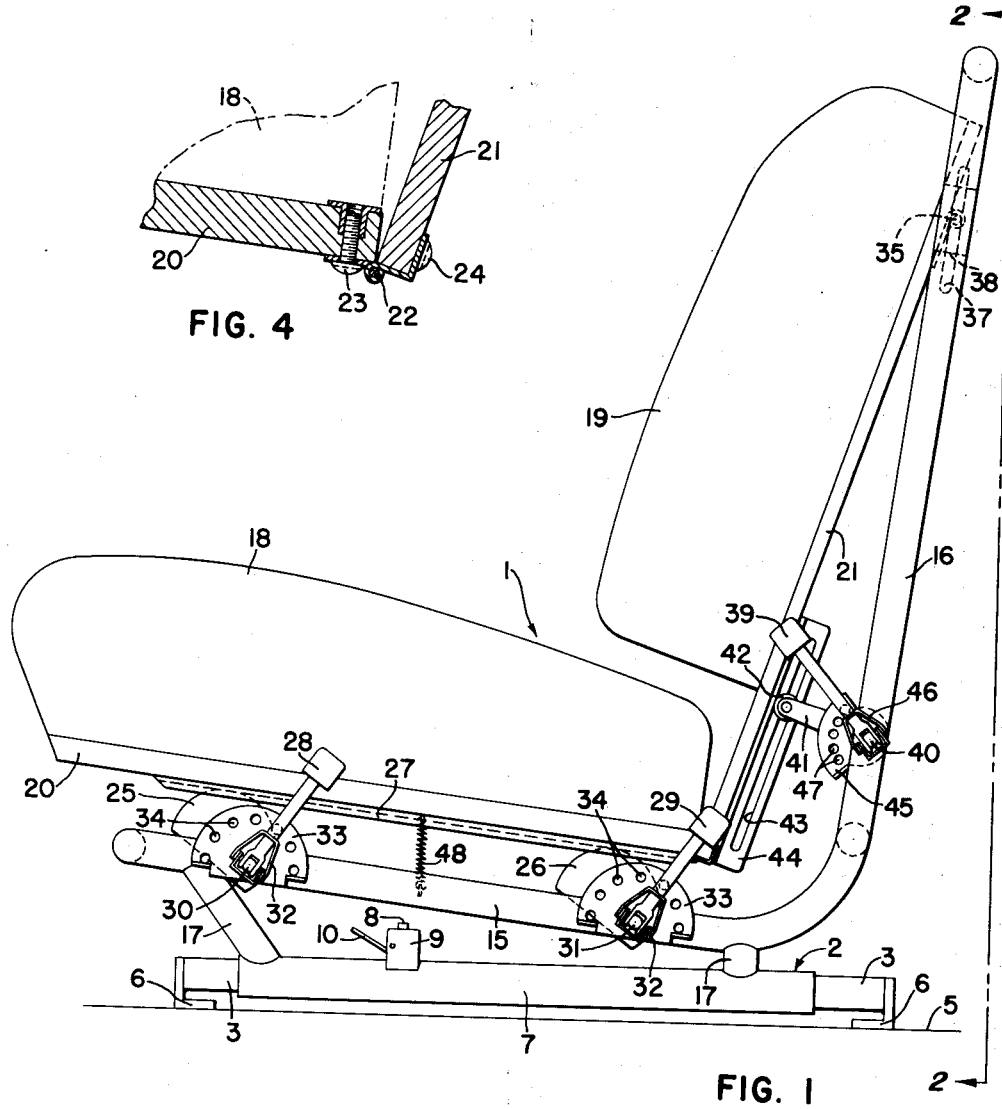
Fig. 1 is a side elevation of a seat embodying the principles of the invention.

Fig. 1 of the drawing best shows that usually the back cushion 19 does not extend the full length of the back board 21 as this permits the base cushion 18 to extend the full depth of the base board 20.

The control lever 39 has a lock plate 45, like the lock plates 33, secured to the back 16 of the main frame and the control lever 39 is urged theretowards by a spring 46 so that a lock stud (not shown) on the control arm 41 will engage with locking bores 47 provided in spaced portions of the lock plate 45 to secure the lever in a desired position.

Any desired number of springs 48 are secured between the base 15 and the base board 20 to draw the base cushion 18 and associated means down resiliently against the cam plates 25 and 26.

From the foregoing, it will be seen that a plurality of adjustments have been provided in the seat of the invention, and that the components of the seat can be positioned for comfortable support of an individual to his own requirements. The seat of the invention is of sturdy construction and provides a maximum of desired adjustments with a minimum of operating parts and control action. Thus it is thought that the objects of the invention have been achieved.

While one representative embodiment has been shown for the purpose of illustrating the invention, it will be apparent to those skilled in this art that various changes and modifications may be made therein without departure from the spirit or scope of the invention.

What is claimed is:

1. A vehicle seat comprising a generally L-shaped frame having a horizontal frame portion and a vertical frame portion, a seat back and a seat bottom adapted to be adjustably supported from said frame and hingedly connected to one another, cooperating cam means on the horizontal frame portion and the front of said seat bottom and similar cooperating cam means on the horizontal frame portion and the back of said seat bottom, said cam means being independently adjustable to change the pitch of said seat bottom and said cam means including cooperating surfaces, one of which is rectilinear to permit adjustment of said seat bottom fore and aft of said frame without disturbing such pitch adjustment, said seat back having a pivotal vertically slidable support at its top engaging the vertical portion of said frame, and support means at the lower portion of said seat back for adjustably supporting it from the vertical frame portion and providing adjustment of inclination of said seat back.

2. A vehicle seat comprising a generally L-shaped frame having a substantially horizontal frame portion and a substantially vertical frame portion, a seat back and a seat bottom hingedly connected to each other, adjustable cam means at the front of the horizontal portion of said frame for supporting said seat beam, adjustable cam means at the back of the horizontal portion of said frame for supporting said seat bottom, said seat bottom having guide means for engaging said cam means and arranged to permit fore and aft movement of said seat bottom relative to said frame without disturbing its pitch, the vertical portion of said frame having vertically slotted guideways, pivots at the top of said seat back engaging said guideways, vertically slotted guideways on the lower portion of said seat back, and adjustable cam means on said frame and engaging in the guideways of said seat back whereby the inclination of said seat back may be adjusted with corresponding fore and aft movement of said seat bottom without changing the pitch of said seat bottom.

3. A vehicle seat comprising a generally L-shaped frame having a substantially horizontal frame portion and a substantially vertical frame portion, a seat back and a seat bottom hingedly connected to each other, adjustable cam means at the front of the horizontal portion of said frame for supporting said seat bottom, adjustable cam means at the back of the horizontal portion of said frame for supporting said seat bottom, said seat bottom having guide means for engaging said cam means and arranged to permit fore and aft movement of said seat bottom relative to said frame without disturbing its pitch, the vertical portion of said frame having vertically slotted guideways, pivots at the top of said seat back engaging said guideways, vertically slotted guideways on the lower portion of said seat back, adjustable cam means on said frame and engaging in the guideways of said seat back whereby the inclination of said seat back may be adjusted with corresponding fore and aft movement of said seat bottom without changing the pitch of said seat bottom, and tension spring means engaging said frame and said seat bottom for holding said seat bottom guide means in engagement with said adjustable cam means on the horizontal portion of said frame.

4. A vehicle seat comprising a generally L-shaped frame having a substantially horizontal frame portion and a substantially vertical frame portion, a seat back and a seat bottom hingedly connected to each other, adjustable cam means at the front of the horizontal portion of said frame for supporting said seat bottom, adjustable cam means at the back of the horizontal portion of said frame for supporting said seat bottom, said seat bottom having guide means for engaging said cam means and arranged to permit fore and aft movement of said seat bottom relative to said frame without disturbing its pitch, the vertical portion of said frame having vertically slotted guideways, pivots at the top of said seat back engaging said guideways, vertically slotted guideways on the lower portion of said seat back, adjustable cam means on said frame and engaging in the guideways of said seat back whereby the inclination of said seat back may be adjusted with corresponding fore and aft movement of said seat bottom without changing the pitch of said seat bottom, and said frame being mounted on said vehicle for adjustment fore and aft thereof to compensate for fore and aft adjustment of said seat bottom due to adjustment of inclination of said seat back.

5. A vehicle seat comprising a generally L-shaped frame having a substantially horizontal frame portion and a substantially vertical frame portion, a seat back and a seat bottom hingedly connected to each other, adjustable cam means at the front of the horizontal portion of said frame for supporting said seat bottom, adjustable cam means at the back of the horizontal portion of said frame for supporting said seat bottom, said seat bottom having guide means for engaging said cam means and arranged to permit fore and aft movement of said seat bottom relative to said frame without disturbing its pitch, the vertical portion of said frame having vertically slotted guideways, pivots at the top of said seat back engaging said guideways, vertically slotted guideways on the lower portion of said seat back, adjustable cam means on said frame and engaging in the guideways of said seat back whereby the inclination of said seat back may be adjusted with corresponding fore and aft movement of said seat bottom without changing the pitch of said seat bottom, tension spring means engaging said frame and said seat bottom for holding said seat bottom guide means in engagement with said adjustable cam means on the horizontal portion of said frame, and said frame being mounted on said vehicle for adjustment fore and aft thereof to compensate for fore and aft adjustment of said seat bottom due to adjustment of inclination of said seat back.

References Cited in the file of this patent

UNITED STATES PATENTS

| | | |
|---|---|---|
| 2,111,519 | Whedon et al. | Mar. 15, 1938 |
| 2,170,923 | Jacobs | Aug. 29, 1939 |
| 2,221,268 | Sears | Nov. 12, 1940 |
| 2,321,716 | Wahlberg | June 15, 1943 |
| 2,600,005 | Kronhaus et al. | June 10, 1952 |
| 2,638,150 | May | May 12, 1953 |

FOREIGN PATENTS

| | | |
|---|---|---|
| 13,777 | Great Britain | 1914 |
| 463,674 | France | Dec. 23, 1913 |
| 474,357 | France | Nov. 21, 1914 |
| 609,118 | Great Britain | Sept. 27, 1948 |